(12) United States Patent
Chen et al.

(10) Patent No.: US 9,160,820 B2
(45) Date of Patent: Oct. 13, 2015

(54) LARGE VOLUME DATA TRANSFER

(71) Applicant: SAP AG, Walldorf (DE)

(72) Inventors: Yingyu Chen, Shanghai (CN); Xiaowei Liu, Shanghai (CN)

(73) Assignee: SAP SE (DE)

( * ) Notice: Subject to any disclaimer, the term of this patent is extended or adjusted under 35 U.S.C. 154(b) by 203 days.

(21) Appl. No.: 13/911,098

(22) Filed: Jun. 6, 2013

(65) Prior Publication Data

US 2014/0359165 A1    Dec. 4, 2014

(30) Foreign Application Priority Data

Jun. 4, 2013   (CN) .......................... 2013 1 0218412

(51) Int. Cl.
*H04L 29/06*   (2006.01)

(52) U.S. Cl.
CPC ...................................... *H04L 69/04* (2013.01)

(58) Field of Classification Search
CPC ........................................................ H04L 69/04
USPC ................................. 709/202, 203, 247, 245
See application file for complete search history.

(56) References Cited

U.S. PATENT DOCUMENTS

| | | | |
|---|---|---|---|
| 5,805,174 A * | 9/1998 | Ramchandran | 345/501 |
| 7,039,505 B1 * | 5/2006 | Southard et al. | 701/3 |
| 7,143,079 B2 | 11/2006 | Pauly et al. | |
| 7,308,477 B1 * | 12/2007 | Gress et al. | 709/206 |
| 8,391,898 B2 | 3/2013 | Kokoszka et al. | |
| 8,429,189 B1 | 4/2013 | Spielberg et al. | |
| 2003/0158842 A1 | 8/2003 | Levy et al. | |
| 2003/0188005 A1 * | 10/2003 | Yoneda et al. | 709/231 |
| 2005/0015374 A1 | 1/2005 | Reinauer et al. | |
| 2009/0018996 A1 | 1/2009 | Hunt et al. | |
| 2009/0030943 A1 | 1/2009 | Kall | |
| 2011/0010461 A1 | 1/2011 | Lassila et al. | |
| 2011/0153548 A1 | 6/2011 | Varghese et al. | |
| 2011/0282914 A1 | 11/2011 | Block et al. | |
| 2012/0042097 A1 | 2/2012 | Dudley | |
| 2012/0066263 A1 | 3/2012 | Wildermuth | |
| 2012/0210119 A1 * | 8/2012 | Baxter et al. | 713/150 |
| 2013/0033389 A1 | 2/2013 | Bendel et al. | |
| 2013/0111381 A1 | 5/2013 | Ritter et al. | |
| 2013/0124545 A1 | 5/2013 | Holmberg et al. | |

OTHER PUBLICATIONS

"High Performance Bulk Data Transfer"—Tierney et al, Joint Techs, Jul. 2010 https://fasterdata.es.net/assets/fasterdata/JT-201010.pdf.*
Yinan Li et al.;SIGMOID 2013;BitWeaving: Fast Scans for Main Memory Data Processing;Jun. 22-27, 2013;15;ACM New York, NY, (USA:http://research.cs.wisc.edu/quickstep/pubs/bitweaving-extended.pdf).

* cited by examiner

*Primary Examiner* — Randy Scott
(74) *Attorney, Agent, or Firm* — Horizon IP Pte. Ltd.

(57) ABSTRACT

Described herein is a technology to facilitate large volume data transfer. In one implementation, an application server determines if an application is invoking a procedure in a data server. If the application is determined to be invoking the procedure, the application data is encoded to compress application data volume. The encoded application data is then transferred from the application server to a data server. At the data server, the application data is decoded for processing by the data server.

20 Claims, 4 Drawing Sheets

LARGE VOLUME DATA TRANSFER

TECHNICAL FIELD

The present disclosure relates generally to databases and more specifically to facilitating large volume data transfer in database systems.

BACKGROUND

A database typically includes one or more database tables for storing data values. To access the data in the database, an application typically issues a database query to a Database Management System (DBMS) that retrieves the data from the database. The DBMS may be structured to support different types of operations from the requesting application server to retrieve, add, modify and/or delete data being stored in the database. The application then interprets the data retrieved from the data server and transforms the data into a format that can be processed by the application.

Typically, the application is written using a high level programming language that provides a high level of abstraction suited for developing business applications, such as developing custom reports and interfaces. The data server, on the other hand, is typically structured to support operations that are programmed using a query language, such as Structured Query Language ("SQL"), to interpret what, where and how data is to be stored and manipulated.

The application may perform various complex calculations based on data retrieved from the data server. In some cases, the data server is optimized to accelerate database operations (e.g., SELECT queries). However, due to the large volume of data that may be returned from the data server to the application and vice versa, the overall performance is still limited by the data transfer time. For example, even if the data server is optimized to accelerate SELECT queries by 100 times, the overall performance may be improved by only 2 to 3 times (or worse) due to delays caused by large volume data transfer.

Currently, there is no unified methodology to handle database function calls to achieve optimized performance. Different developers may use different approaches to call database functions and retrieve data for use by the application. In a bad case scenario, the shared connection between the application and data server is reset while the data in the temporary database table is still needed for processing by the application.

Therefore, there is a need for an improved framework that addresses the above-mentioned challenges.

SUMMARY

A technology for facilitating large volume data transfer is described herein. In accordance with one aspect, an application server determines if an application is invoking a procedure in a data server. If the application is determined to be invoking the procedure, application data is encoded to compress application data volume. The encoded application data is then transferred from the application server to a data server. At the data server, the application data is decoded for processing by the data server.

In accordance with another aspect, application data is encoded at an application server to compress application data volume. The encoded application data is then transferred from the application server to a data server. At the data server, the application data may be decoded for processing by the data server. Next, results data generated in response to invoking a procedure in the data server may be encoded to compress results data volume. The encoded results data may then be transferred from the data server to the application server. At the application server, the results data may be decoded for processing by the application server.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A technology for facilitating large volume data transfer is described herein. One aspect of the technology provides an encode-decode framework for reducing data volume and thereby improving data transfer speeds. In one implementation, retrieved data is first encoded at a data server, transferred to and then decoded at an application server for use by an application. Conversely, data from the application server may also be encoded at the application server, transferred to and then decoded at the data server for storage.

The present technology effectively solves the bottleneck problem caused by large volume data transfer between application and data servers. Since large data volumes no longer limit the overall performance of the system, the application designer may incorporate as many calls to database functions as necessary to enhance performance. In addition, the encode-decode process does not take up resources significant enough to impair overall performance when calling database functions and returning results. Further, the present framework may be provided as a unified solution (e.g., common library functions) for users to design and develop applications based on accelerated database operations. These and other advantages and aspects will be described in more detail in the following description.

The framework described herein may be implemented as a method, a computer-controlled apparatus, a computer process, a computing system, or as an article of manufacture such as a computer-usable medium. These and various other features will be apparent from the following description.

Figure 1:
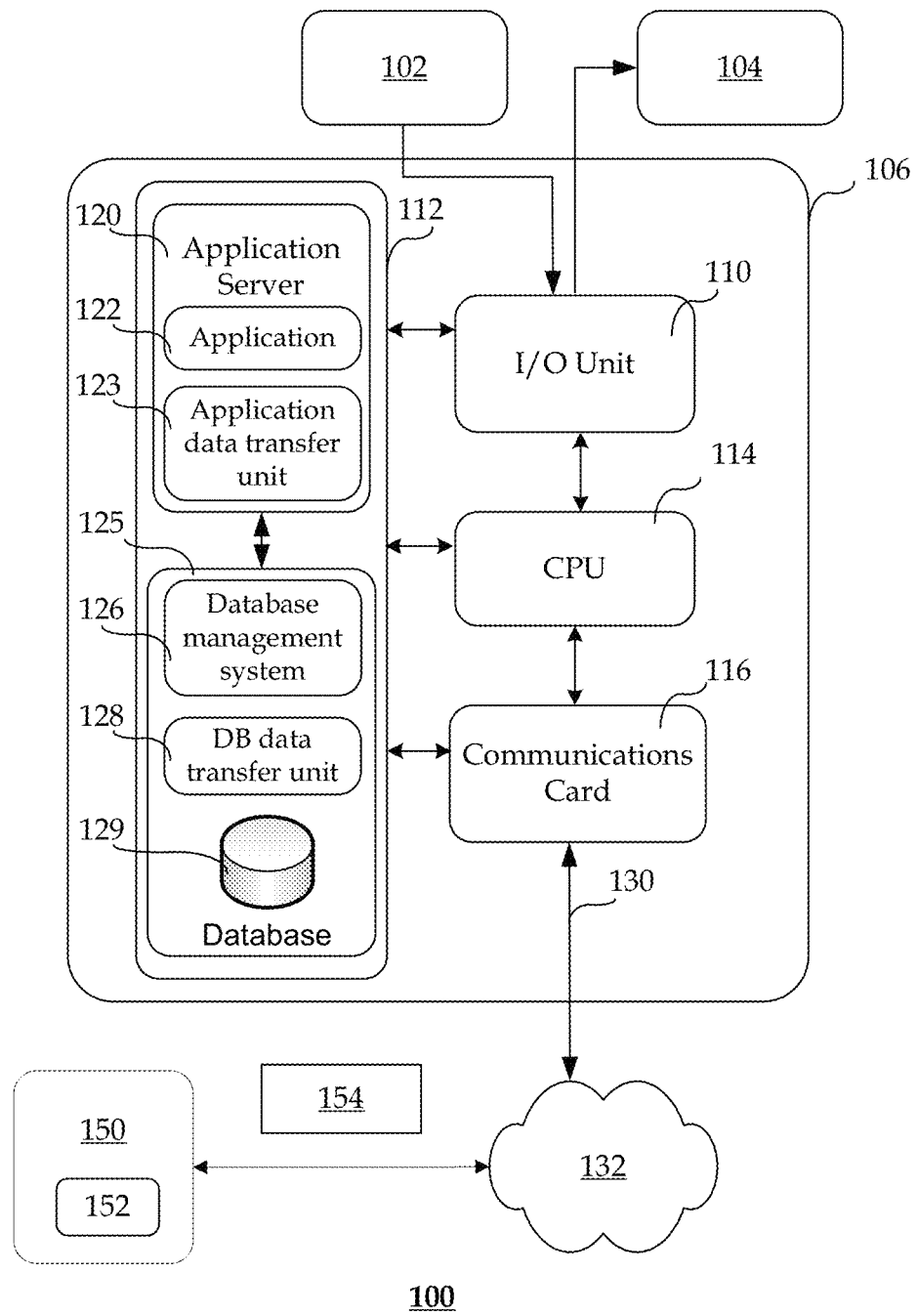
FIG. 1 is a block diagram illustrating an exemplary system.

FIG. 1 shows a block diagram illustrating an exemplary system 100 that may be used to implement the framework described herein. System 100 may include a computer system 106 communicatively coupled to an input device 102 (e.g., keyboard, touchpad, microphone, camera, etc.) and an output device 104 (e.g., display device, monitor, printer, speaker, etc.). Computer system 106 may also include a communications card or device 116 (e.g., a modem and/or a network adapter) for exchanging data with network 132 using a communications link 130 (e.g., a telephone line, a wireless network link, a wired network link, or a cable network). Network 132 may be a local area network (LAN) or a wide area network (WAN). The computer system 106 may be communicatively coupled to one or more other computer systems 154 via network 132. For example, computer system 106 may act as a server and operate in a networked environment using logical connections to one or more client computers 150.

Computer system 106 includes a central processing unit (CPU) 114, an input/output (I/O) unit 110, and a memory module 112. Other support circuits, such as a cache, a power supply, clock circuits and a communications bus, may also be included in computer system 106. In addition, any of the foregoing may be supplemented by, or incorporated in, application-specific integrated circuits. Examples of computer system 106 include a handheld device, a mobile device, a personal digital assistance (PDA), a workstation, a server, a portable laptop computer, another portable device, a mini-computer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various software components for implementing the techniques described herein, all of which may be processed by CPU 114. As such, the computer system 106 is a general-purpose computer system that becomes a specific-purpose computer system when executing the machine-executable instructions. Alternatively, the various techniques described herein may be implemented as part of a software product, which is executed via an application server 120 and/or a data server 125. Each computer program may be implemented in a high-level procedural or object-oriented programming language (e.g., C, C++, Java, Advanced Business Application Programming (ABAP™) from SAP® AG, Structured Query Language (SQL), L language, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In one implementation, the memory module 112 of the computer system 106 includes an application server (or stack) 120 and a data server (or stack) 125. Application server (or stack) 120 may store an application 122 and an application data transfer unit 123 that may be coded using a high-level programming language, such as Java, C++, ABAP™, etc. Other types of programming languages are also useful.

Application 122 may include a set of function modules or programs (e.g., ABAP function modules) of a business application designed to perform various business functions, such as customer relationship management (CRM), enterprise resource planning (ERP) application, human resource management, enterprise content management (ECM), business process management (BPM), product lifecycle management, business intelligence, and so forth.

Application data transfer unit 123 may serve to process incoming and outgoing data from the application server 120 for facilitating efficient large volume data transfer. More particularly, application data transfer unit 123 may serve to prepare outgoing data for transfer to the data server 125, and process incoming data from the data server 125 for use by the application 122. More details of these components will be provided in the following description.

Data server (or stack) 125 may include a database management system (DBMS) 126, a database (DB) data transfer unit 128 and a database 129. DBMS 126 and DB data transfer unit 128 may be coded using a database query language, such as SQL or extensions thereof. Other types of programming languages are also useful. DBMS 126 may include a set of programs or procedures (e.g., HANA custom procedures) for defining, administering and processing the database 129. A user at the client computer 150 may interact with a user interface 152 to communicate with the database 129 via the application server 120 and the DBMS 126. DB data transfer unit 128 may serve to process incoming and outgoing data from the data server 125. More particularly, DB data transfer unit 128 may serve to prepare outgoing data for transfer to the application server 120, and process incoming data from the application server 120 for storing in the database 129. More details of these components will be provided in the following description.

In one implementation, database 129 is an in-memory database that relies primarily on the system's main memory for efficient computer data storage. More particularly, the data in the in-memory database may reside in volatile memory and not persistently stored on a hard drive, thereby allowing the data to be instantly accessed and scanned at a speed of several megabytes per millisecond. The in-memory database 129 allows seamless access to and propagation of high volumes of data in real-time. Parallel processing may further be achieved by using a multicore processor 114 in conjunction with the in-memory database 129. In-memory database technology includes systems such as SAP's HANA (high performance analytic appliance) in-memory computing engine.

Column-based data storage may further be implemented in the in-memory database 129, where data tables are stored as columns of data, in sequence and in compressed memory blocks. This may facilitate faster aggregation of data when calculations are performed on single columns. Alternatively, row-based data storage is also possible. In some implementations, instead of updating entire rows, only fields that have changed will be updated. This avoids having to lock entire data tables during updates to prevent conflicting modifications to a set of data. High levels of parallelization may be achieved, which is critical to real-time processing of live data streams and performing constant and substantially simultaneous updates.

It should be appreciated that the different components and sub-components of the computer system 106 may be located on different machines or systems. For example, application server 120 and data server 125 may be implemented on different physical machines or computer systems. It should further be appreciated that the different components of the client computer 150 may also be located on the computer system 106.

Figure 2:
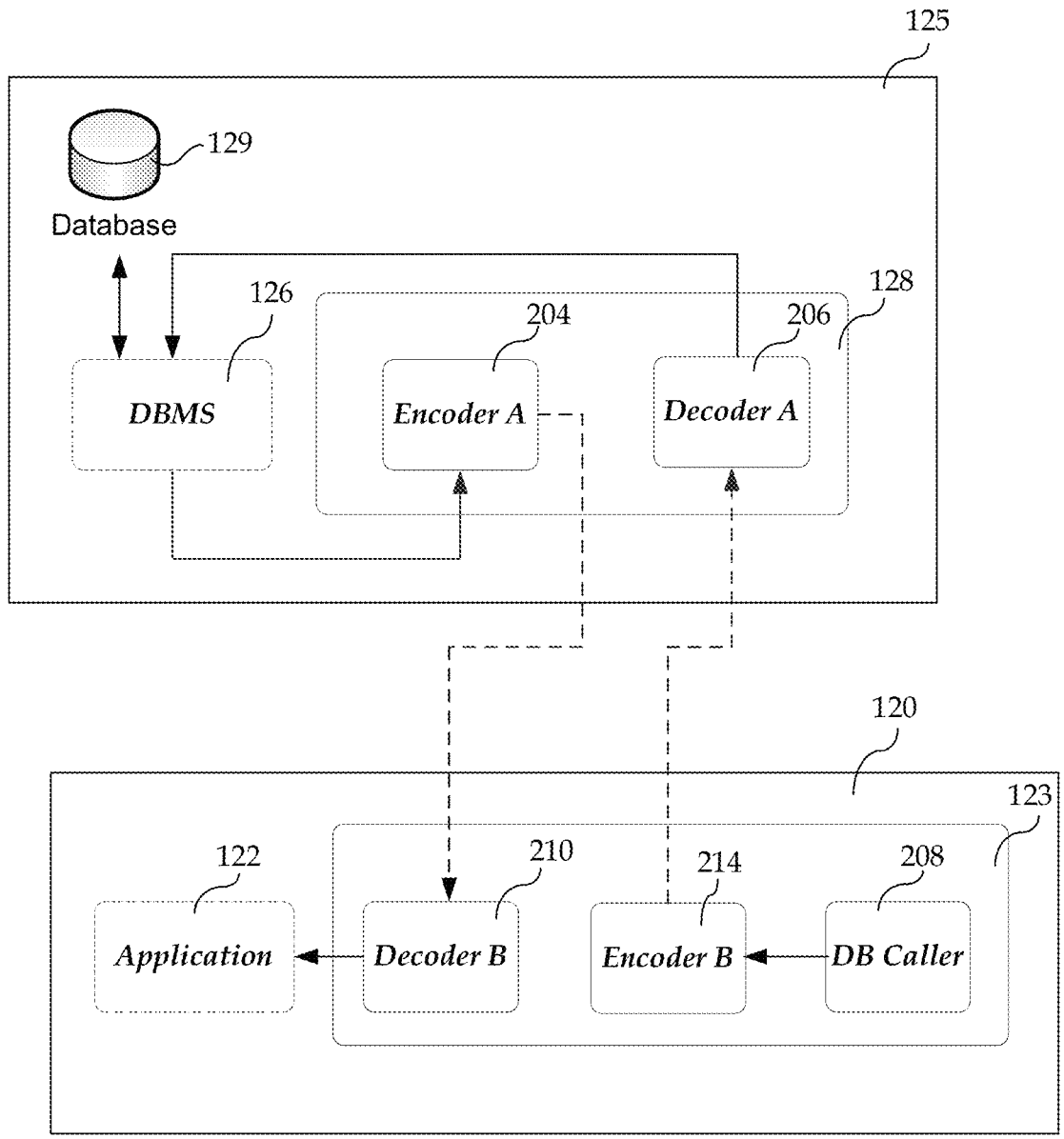
FIG. 2 shows an exemplary architecture of the application server and the data server.

FIG. 2 shows an exemplary architecture 200 of the application server 120 and the data server 125. In some implementations, the application and data servers (120, 125) may include less or many more components than those shown in FIG. 2.

As shown, data server 125 may include a DBMS 126, a DB data transfer unit 128 and a database 129. Application server 120 may include application 122 and application data transfer unit 123. In one implementation, DB data transfer unit 128 includes encoder A (204) and decoder A (206), while application data transfer unit 123 includes encoder B (214), decoder B (210), and DB caller 208. DB data transfer unit 128 and application data transfer unit 123 may serve to facilitate efficient data transfer between data server 125 and application server 120 by compressing the data volume. More particularly, encoders A and B (204, 214) may implement a lossless data compression algorithm that allows decoders B and A (210, 206) respectively to reconstruct the exact original data from the compressed data. Examples of lossless algorithms include LZ77, LZ78, LZW, and so forth.

In response to a request from application 122, DBMS 126 may retrieve the data from the database 129 for processing. Prior to transmitting the retrieved data to the application server 120, the retrieved data may be encoded by encoder A (204) to compress the data volume and thereby enhance transfer speed. The encoded data may then be transferred to the decoder B (210) in the application server 120, which decodes (and decompresses) the data for processing by application 122.

Application 122 may write application data (e.g., computation results, reports, etc.) to database 129 if necessary. Prior to transmitting the application data to the data server 125 for further processing, DB caller 208 may prepare the application data for encoding by encoder B (214). DB caller 208 may then invoke encoder B (214) to encode the prepared data to compress the data volume. The encoded data may then be transferred to the decoder A (206) in the data server 125, which decodes (and decompresses) the data for processing by the DBMS 126.

Figure 3:
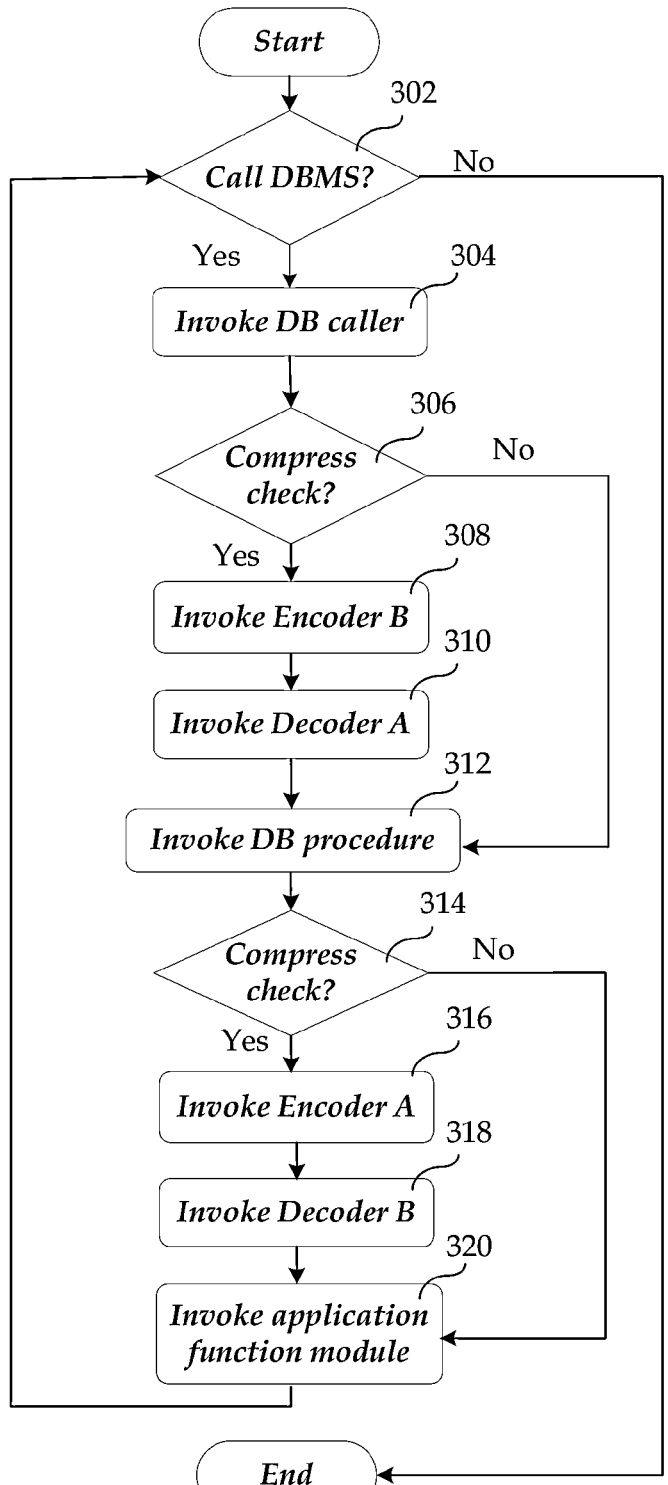
FIG. 3 shows an exemplary process of transferring data.

FIG. 3 shows an exemplary process 300 of transferring data between the application server 120 and the data server 125. The process 300 may be implemented by the system 100 and/or architecture 200, as previously described with reference to FIGS. 1 and 2. It should be noted that in the following discussion, reference will be made, using like numerals, to the features described in FIGS. 1 and 2.

At 302, the application data transfer unit 123 in the application server 120 determines whether a stored procedure or function module in the data server 125 is to be called. A stored procedure is a set of commands which are compiled and stored inside the DBMS 126 of the data server 125. A stored procedure may be called when, for example, the application 122 is accessing, updating or storing data in the database 129. In some implementations, the DB caller 208 parses the code of application 122 to determine if a call to the DBMS 126 is necessary. If no call to a stored procedure in the DBMS 126 is necessary, the process 300 ends; otherwise, the process 300 continues at 304.

At 304, the DB caller 208 proceeds to invoke the stored procedure or function module in the DBMS 126. In some implementations where the components in the application server 120 are coded using ABAP, the DB caller 208 may call the stored procedure or function module using ABAP Database Connectivity (ADBC). ADBC is an application programming interface (API) that may be used to establish and administer database connections, send database specific SQL commands to the DBMS 126 and process the results. Other types of database connectivity APIs may also be used. To establish and administer a connection with the DBMS 126, a database user name, password, default schema, connection type and/or other settings may be pre-configured and maintained in a data structure (e.g., SAP's table DBCO) stored in the application server 120.

At 306, DB caller 208 determines if compression of the application data volume is necessary. Compression may be determined to be necessary if the size or volume of the application data (e.g., table size or number of columns) to be transferred to the data server 125 exceeds a predetermined threshold. The threshold may be application-specific, and may depend not only on the type of application data, but also the hardware and network environment. Different types of application data generally refer to data from different tables with, for example, different structures and different repeatable rates.

Based on the determination of whether compression is necessary, the DB caller 208 sets a compress option accordingly. The compress option may be passed along with other named parameters (e.g., stored procedure name) when the DB caller 208 invokes the stored procedure in the DBMS 126. The compress option informs the DBMS 126 whether or not the application data received by the DBMS 126 has been compressed by encoder B (214).

If compression is determined to be unnecessary, the process 300 continues at step 312. Otherwise, if compression is determined to be necessary, DB caller 208 prepares the application data for compression by encoder B (214). The application data may be initially stored in an internal table (e.g., ABAP internal table) or any other native data structure. To prepare the application data for compression, DB caller 208 may convert (e.g., serialize) the application data in the native data structure into a binary or text file. The text file may be in the form of a comma-separated values (CSV) file or any other suitable format. The CSV file may include column names and column data separated by a literal comma, tab or any other character or string.

At 308, DB caller 208 invokes encoder B (214) in the application server 120. Encoder B (214) compresses the prepared application data to reduce its size or volume. In some implementations, the encoder B (214) may execute a lossless data compression algorithm, such as LZ77, LZ78, LZW, etc. to compress the prepared application data. Lossless data compression algorithms typically exploit statistical redundancy to represent data more concisely without losing information. The compressed application data may be stored as binary data in a database table compatible with the data server 125. The database table may then be transferred to the data server 125 via, for example, a database connection (e.g., ADBC) established by the DB caller 208.

At 310, decoder A (206) at data server 125 receives the compressed application data via, for example, a database connection. The decoder A (206) is invoked to decode the compressed application data (or database table). During decoding, the compressed application data may be converted from a binary database table to a CSV string. Any other types of formats are also useful. Decoder A (206) uses the same type of algorithm (e.g., LZ77) as encoder B (214) to decode the compressed application data. For instance, decoder A (206) may reverse the same lossless data compression algorithm (e.g., LZ77, LZ78, LZW, etc.) to decode the compressed application data to an exact digital duplicate of the original application data. The decoded application data may be in the form of a CSV string, or any other suitable format. In one implementation, decoder A (206) further processes the decoded application data by parsing the column header and column data line by line, and inserting the column data in the corresponding database table.

At 312, decoder A (206) invokes the respective DB procedure in the DBMS 126 to generate results data. Results data may be generated by the DB procedure processing the decoded application data and/or retrieving data from the database 129. The DB procedure may be a stored procedure that is called to, for example, retrieve, update or store the decoded application data in the DBMS 126.

At 314, the DBMS 126 determines if compression is necessary for results data of the DB procedure that are to be returned to the application server 120. It is understood that steps 314, 316, 318 and 320 may not be necessary in situations when no results data are to be returned to the application server 120. The DBMS 126 may determine compression to be necessary if the size or volume of the results data (e.g., table size or number of columns) exceeds a predetermined threshold. Based on such determination, the DBMS 126 sets a compress option accordingly. The compress option may be passed along with other named parameters (e.g., function module name) when the DBMS 126 calls a named function module or program in the application 122. The compress option informs the application 122 whether or not the results data received by the application server 120 has been compressed by encoder A (204).

If compression is determined to be unnecessary, the process 300 continues at step 320. Otherwise, if compression is determined to be necessary, DBMS 126 prepares the results data for compression by encoder A (204). The results data may be initially stored in a native data structure (e.g., internal database record set or table). To prepare the results data for compression, DBMS 126 may convert (e.g., serialize) the results data stored in the native data structure into a binary or text file. The text file may be in the form of a comma-separated values (CSV) file or any other suitable format. The CSV file may include column names and column data separated by a literal comma, tab or any other character or string.

At 316, DBMS 126 invokes encoder A (204) in the data server 125. Encoder A (204) compresses the prepared results data to reduce its size or volume. In some implementations, encoder A (204) may execute a lossless data compression algorithm, such as LZ77, LZ78, LZW, etc. to compress the prepared results data. The compressed results data may be stored and transferred as binary data. The compressed results data may then be transferred to the application server 120 via a database connection (e.g., ADBC) established by the DBMS 126.

At 318, decoder B (210) at application server 120 receives the compressed results data. Decoder B (210) is invoked to decode the compressed results data. During decoding, the compressed results data may be converted from a binary file to a CSV string or other text format. Any other types of formats are also useful. Decoder B (210) uses the same type of algorithm (e.g., LZ77) as encoder A (204) to decode the compressed results data. The decoded results data may be in the form of a CSV string, or any other suitable format. In one implementation, decoder B (210) further processes the decoded results data by deserializing it. For instance, decoder B (210) may read the column header and column data line by line, and inserting the column data in the corresponding internal table.

At 320, decoder B (210) invokes the respective application function module or program in the application 122 to process the decoded results data. The process 300 then continues at 302 to determine if a call to the DBMS 126 is necessary. It should be appreciated that process 300 may be repeated for each call to the DBMS 126 encountered in the code of the application 122.

Figure 4A:
FIGS. 4a and 4b illustrate experimental results obtained from tests with different internal tables and different sizes of data.

FIG. 4a illustrates experimental results obtained from testing the present framework with different internal tables and different sizes of data. VBAP, VBAK and MARA are standard transparent internal tables. Table 400 shows the compression ratios obtained for the different types of internal tables with different sizes. It may observed that the compression ratios were generally very high for typical ERP data stored in such tables, reaching as high as 75.3:1. The compression ratios were generally higher for tables with high numbers of repetitive rows. This allows the data transfer time to be reduced significantly.

Figure 4B:

FIG. 4b compares the retrieval times obtained with and without compression for the different types of internal tables described in FIG. 4a. The total retrieval time with compression is computed by adding the time taken to prepare, encode, retrieve, decode and de-serialize the data to the respective internal table. It may be observed from table 410 that the larger the data size (e.g., VBAP), the more savings are achieved in the data retrieval time (e.g., from 67 seconds without compression to 18.3 seconds with compression).

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of data transfer, comprising:
encoding, at an application server, application data to compress application data volume;
transferring the encoded application data from the application server to a data server;
decoding, at the data server, the encoded application data for processing by the data server;
encoding, at the data server, results data generated in response to invoking a procedure in the data server, wherein the encoding compresses volume of the results data;
transferring the encoded results data from the data server to the application server; and
decoding, at the application server, the encoded results data for processing by the application server.

2. A method of data transfer, comprising:
determining, at an application server, whether an application is invoking a procedure in a data server by parsing code of the application;
in response to the application being determined to be invoking the procedure in the data server, encoding, at the application server, application data to compress application data volume;
transferring the encoded application data from the application server to the data server; and
decoding, at the data server, the encoded application data for processing by the data server.

3. The method of claim 2 wherein the data server comprises an in-memory database.

4. The method of claim 2 further comprising invoking, at the application server, the procedure in the data server via a database connectivity application programming interface.

5. The method of claim 2 further comprising:
determining whether compression of the application data volume is necessary; and if the compression is determined to be necessary, preparing the application data for encoding.

6. The method of claim 5 wherein the compression of the application data volume is determined to be necessary when the size of the application data exceeds a predetermined threshold.

7. The method of claim 5 wherein preparing the application data for encoding comprises converting the application data from a native data structure into a text file.

8. The method of claim 2 wherein encoding the application data to compress the application data volume comprises executing a lossless data compression algorithm.

9. The method of claim 8 wherein the lossless data compression algorithm comprises an LZ77, LZ78 or LZW algorithm.

10. The method of claim 2 wherein decoding the encoded application data comprises reversing a lossless data compression algorithm.

11. The method of claim 10 wherein the lossless data compression algorithm comprises an LZ77, LZ78 or LZW algorithm.

12. The method of claim 2 further comprising:
generating, at the data server, results data in response to invoking the procedure;
determining, at the data server, whether compression of the results data is necessary; and
if the compression of the results data is determined to be necessary, preparing the results data for encoding.

13. The method of claim 12 wherein preparing the results data for encoding comprises converting the results data from a native data structure into a text file.

14. The method of claim 12 further comprising:
encoding, at the data server, the prepared results data to compress results data volume;
transferring the encoded results data from the data server to the application server; and
decoding, at the application server, the encoded results data for processing by the application server.

15. The method of claim 14 wherein encoding the prepared results data to compress the results data volume comprises executing a lossless data compression algorithm.

16. The method of claim 15 wherein the lossless data compression algorithm comprises an LZ77, LZ78 or LZW algorithm.

17. The method of claim 14 wherein decoding the encoded results data comprises reversing a lossless data compression algorithm.

18. The method of claim 17 wherein the lossless data compression algorithm comprises an LZ77, LZ78 or LZW algorithm.

19. A non-transitory computer-readable medium having stored thereon program code, the program code executable by a computer to:
determine, at an application server, whether an application is invoking a procedure in a data server by parsing code of the application;
in response to the application being determined to be invoking the procedure in the data server, encode, at the application server, application data to compress application data volume;
transfer the encoded application data from the application server to the data server for decoding and processing.

20. A system comprising:
a non-transitory memory device for storing computer readable program code; and
a processor in communication with the memory device, the processor being operative with the computer readable program code to
generate, at a data server, results data in response to invoking a procedure in the data server,
encode, at the data server, the results data, wherein the encoding compresses volume of the results data, and
transfer the encoded results data from the data server to an application server for decoding and processing.

* * * * *